United States Patent [19]

Neal

[11] 3,989,623

[45] Nov. 2, 1976

[54] PROCESS FOR RECOVERY OF DISSOLVED MERCURY SALTS FROM AQUEOUS SOLUTIONS

[75] Inventor: John A. Neal, Bellingham, Wash.

[73] Assignee: Georgia-Pacific Corporation, Portland, Oreg.

[22] Filed: Sept. 8, 1975

[21] Appl. No.: 610,938

[52] U.S. Cl. .............................. 210/28; 210/38 B; 210/51
[51] Int. Cl.² ......................................... B01D 15/00
[58] Field of Search ............... 210/38 B, 40, 28, 50, 210/24, 42, 502, 503, 45, 49, 51; 423/100, 101, 561; 75/121, 101 BE

[56] References Cited
UNITED STATES PATENTS

| 3,718,457 | 2/1973 | Entwisle et al. .................... 210/503 |
|---|---|---|
| 3,749,761 | 7/1973 | Dean et al. ........................... 210/40 |
| 3,790,370 | 2/1974 | Lalancette ............................ 210/42 |
| 3,901,802 | 8/1975 | Peeters et al. ..................... 210/38 B |

FOREIGN PATENTS OR APPLICATIONS

| 2,094,528 | 1/1972 | France .................................. 210/40 |
|---|---|---|
| 47-44155 | 8/1972 | Japan .................................. 210/38 |

OTHER PUBLICATIONS

Chem. Abstract, vol. 71, 108676e, (1969).

*Primary Examiner*—Charles N. Hart
*Assistant Examiner*—Benoit Castel
*Attorney, Agent, or Firm*—Peter P. Chevis

[57] ABSTRACT

A process for recovery of dissolved mercury salts from aqueous solution is described which involves precipitating the mercury as mercury sulfide and contacting the solution with zinc sulfide particles.

9 Claims, No Drawings

PROCESS FOR RECOVERY OF DISSOLVED MERCURY SALTS FROM AQUEOUS SOLUTIONS

This invention pertains to a process for the removal of dissolved mercury salts from aqueous solutions. More particularly, it pertains to removal of the dissolved mercury salts by precipitating the mercury as mercury sulfide and contacting the aqueous solution with zinc sulfide particles.

Considerable effort has been expended by industry and governmental agencies to reduce the mercury contamination in aqueous effluent streams to levels of few parts per billion. Various methods have been described. For example, in U.S. Pat. No. 3,704,875 a method is disclosed whereby the effluent stream containing a trace amount of mercury in both elemental form and as mercuric ion is passed through a closed vessel having a bed of reactive metal particles, such as zinc, magnesium, aluminum, and iron to have the mercury removed by forming an amalgam with the metal. The use of a metal, sulfide generating agent, and certain thio-compounds in combination with an adsorbent, such as activated carbon, or diatomaceous earth is disclosed in U.S. Pat. No. 3,873,581. It is also well known that the solubility of mercury sulfide is exceedingly low and many processes for mercury recovery are based upon mercury sulfide precipitation or formation. However, precipitation of mercury sulfide from a solution containing small amounts of mercury and low ionic strength results in obtaining an extremely fine colloidal-type sol or dispersion of mercury sulfide which cannot be filtered out or easily removed. The use of flocculating agents to aid in the flocculation and separation of the mercury sulfide is disclosed, for example, in U.S. Pat. Nos. 2,860,952 and 3,835,217. In these patents, large excesses of reactants are used and the flocculating agent is formed in situ by using a metal which under alkaline conditions will form a gelatinous compound, such as an insoluble metal oxide to function as the flocculating agent. The disadvantage with most of these processes is that it is difficult to reduce the mercury level in the effluent to the extent desired without use of large excess of reactants or the difficulties of separation and recovery of gelatinous-type materials from solution. U.S. Pat. No. 3,740,331 discloses that certain heavy metals present in the effluent at the time of mercury sulfide formation results in a co-precipitation of the mercury sulfide with the heavy metal to enhance the recovery of the mercury. The use of heavy metals to co-precipitate with the mercury sulfide as described in the latter patent may result in obtaining good reductions in the mercury content in the effluent. However, an excess of the heavy metal is used which results in a portion of the metal added remaining as a pollutant or contaminant in the effluent. Even with careful control, the variations in concentration of various pollutants normally encountered in effluent streams make it difficult to control the addition of the metal to avoid excesses. Thus, it is very desirable to have a process for removing of mercury from aqueous effluents which would not require close control, difficult separation or filtration steps, or result in contamination of the effluent with another undesirable heavy metal.

It is, therefore, an object of this invention to provide a process for removing of mercury from aqueous effluents without using a heavy metal reactant which will contaminate the treated effluent. A further object is to provide a process for removal of mercury from aqueous solutions which is effective to reduce the mercury concentrations to below one part per million. A still further object is to provide an effective process for removal of mercury from effluent streams requiring minimum of control.

The above and other objects are attained by this invention which comprises treating the effluent stream containing the mercury with a water-soluble sulfide compound to react with the mercury to form mercury sulfide, contacting the effluent with the zinc sulfide particles to combine the mercury sulfide with the zinc sulfide particles and to remove the mercury sulfide from the effluent. Apparently, the fine colloidal particles of mercury sulfide are adsorbed to the surface of zinc sulfide particles or in some other manner becomes attached to the particle to be thus easily removed from the effluent. Since zinc sulfide is insoluble, practically no contamination of the effluent with zinc ion is obtained.

The zinc sulfide may be added to the effluent or intermixed with the filter medium and the effluent filtered through the medium, the only requirement being that the mercury sulfide in the effluent be contacted with the zinc sulfide. Generally, more effective contact can be made by intermixing the zinc sulfide with the effluent prior to filtration, centrifugation, settling or other separation means. When the zinc sulfide is added to the filter medium, generally larger amounts of zinc sulfide may have to be used to insure contact of the mercury sulfide with the zinc sulfide in passing through the filter without having to recycle the effluent. The amount of zinc sulfide used will vary with the amount of mercury present in the effluent and the particle size of the zinc sulfide. Since the amount of mercury contamination is generaly relatively low, the actual amount of zinc sulfide used is small even though the amount may be in excess stoichiometrically to the amount of mercury present. The excess is not harmful in the filtration or separation step so that generally sufficient amount of the zinc sulfide particles are used to obtain rapid contact of the mercury sulfide with the zinc sulfide particles to remove substantially all the mercury sulfide without the need of excess mixing or contact time.

No particular form of zinc sulfide is necessary. Thus, powdered zinc sulfide may be intermixed or the zinc sulfide may be precipitated by addition of a soluble sulfide to a zinc salt solution and the zinc sulfide precipitate obtained added to the filter medium or effluent after the precipitate is washed to remove the unreacted constituents which may adhere to the precipitate.

While the process step of contacting the effluent with the zinc sulfide is the most effective under acidic conditions, for example at a pH of 3 to 6, it is also operative under mild alkaline conditions, for example not exceeding a pH of around 8.5 or an alkalinity resulting in appreciable solubilization of the mercury by mercury polysulfide formation if an excess sulfide is present. Preferably, the process step is carried out at a pH in the range of 4 to 6. The mercury sulfide formation may be carried out under the above conditions or under other conditions normally used for the particular water-soluble sulfide or sulfide generating compound employed and the pH adjusted to the above conditions for the contact or treatment with the zinc sulfide particles.

The process is also effective for waste effluents having low ionic strength such as those which may be obtained in mercury cathode chlorine cell operations or from other processes, especially effluent streams which are being discharged from the process or plant containing ionic strengths equivalent to 0.005 to 0.1 molar sodium chloride solution. Apparently, in the low ionic strength solutions finer particles of mercury sulfide are obtained than in more concentrated solutions. For example, in effluent streams containing about 1 molar concentration of sodium chloride, the mercury sulfide precipitate obtained may be of sufficient size to be filterable to remove a substantial portion of the mercury sulfide. The addition of zinc sulfide only enhances the removal. However, upon dilution of the solution to 0.01 molar concentration of sodium chloride, the major portion of the mercury is precipitated in the form which cannot be removed by filtration or other readily available means.

The following examples further illustrate the invention.

EXAMPLE I

A mercury-containing solution was prepared by addition of mercuric chloride and sodium chloride to water. The mercury and sodium chloride were added to water in amounts to provide two parts per million of mercury in a 0.01 molar sodium chloride solution. To the solution, a dilute sodium sulfide solution was added in an amount to provide 8 parts per million of sulfide ion. After intermixing the sodium sulfide solution with the mercury-containing solution, 50 milliliters of the mixture was passed through a two-stage filter. The filter was prepared by slurring 0.7 grams of a diatomaceous earth filter aid with 0.1 grams of powdered zinc sulfide and depositing the filter aid upon a filter circle. Upon depositing the filter aid containing the zinc sulfide, a filter circle was placed on top of the filter medium and an additional 0.7 grams of the filter aid was deposited on top without containing any zinc sulfide. Fifty milliliters of the mercury-containing solution was passed through the filter such that the solution first passed through the filter medium without the zinc sulfide before passing through the medium containing the zinc sulfide. The effluent obtained contained about six parts per billion of mercury. The filter mediums were separated and analyzed for mercury. The top layer which did not contain zinc sulfide had retained only about 21% of the mercury removed, while the bottom layer with the zinc sulfide removed 79% of the mercury.

EXAMPLE II

A mercury solution containing about two parts per million of mercury prepared by addition of mercury nitrate to water with addition of sodium chloride to obtain a 0.01 molar sodium chloride solution was prepared. To this solution, a sodium sulfide solution was added in an amount of about eight parts per million of sulfide. The pH was adjusted to pH 5 by addition of sulfuric acid. Samples of this solution in an amount of 50 milliliters each were contacted with zinc sulfide by various methods and the mercury removal determined. When the zinc sulfide powder in amounts of 0.1 grams and 1 gram was intermixed with 50 milliliter samples of the mercury-containing solution and the mixtures filtered through 0.7 grams of diatomaceous filter aid, the filtrate in each of the runs contained less than six parts per billion of mercury. The same results were obtained when the zinc sulfide powder was intermixed with the filter aid in the amounts of 0.1 and 1 gram of powder per 0.7 grams of the filter aid. In each of the runs, the filtrate obtained contained less than six parts per billion. A third series of runs was made where after depositing the pre-coat filter medium, a slurry of zinc sulfide in water was passed through the medium to deposit a layer of zinc sulfide on the medium. In the run in which 0.1 grams of zinc sulfide was used, the filtrate obtained contained about 104 parts of mercury per billion. However, in the run where 1 gram of zinc sulfide was used, the filtrate obtained contained less than six parts per billion.

In passing the mercury solution of 0.01 molar sodium chloride through the filter aid medium to which no zinc sulfide had been added or intermixed with the solution, substantially no mercury was removed.

What is claimed is:
1. A process for removing mercury from an aqueous solution containing dissolved mercury salts which comprises, treating the solution with a water-soluble sulfide compound to react mercury with the sulfide ion to form a mercury sulfide precipitate, contacting the solution containing the mercury sulfide precipitate with zinc sulfide particles at a pH in the range of 3 to 8.5 to remove the mercury sulfide from the solution.
2. A process according to claim 1 wherein the pH is in the range of 4 to 6.
3. A process according to claim 2 wherein the solution is contacted with zinc sulfide particles by intermixing the zinc sulfide particles with the solution, and removing the mercury sulfide with the zinc sulfide particles from the solution.
4. A process according to claim 2 wherein the solution is contacted with the zinc sulfide particles by passing the solution through a filter medium containing zinc sulfide particles.
5. A process according to claim 2 wherein an aqueous solution containing the dissolved mercury salt is a mercury cathode electrolytic cell effluent.
6. A process according to claim 5 wherein the mercury cathode electrolytic cell effluent has an ionic strength of less than 1 molar.
7. A process according to claim 6 wherein the ionic strength of the mercury cathode cell effluent is in the range of 0.005 to 0.1 molar.
8. A process according to claim 7 wherein the mercury sulfide is contacted with the zinc sulfide particles by intermixing the zinc sulfide particles with the effluent, and removing the mercury sulfide with the zinc sulfide particles from the effluent.
9. A process according to claim 7 wherein the mercury sulfide is contacted with the zinc sulfide particles by passing the effluent stream containing the mercury sulfide through a filter medium having dispersed therein zinc sulfide particles.

* * * * *